US012735915B2

(12) United States Patent
Huang et al.

(10) Patent No.: US 12,735,915 B2
(45) Date of Patent: Sep. 15, 2026

(54) ELECTRIC LOCK AND CLUTCH MECHANISM THEREOF

(71) Applicant: TAIWAN FU HSING INDUSTRIAL CO., LTD., Kaohsiung City (TW)

(72) Inventors: Chao-Ming Huang, Kaohsiung City (TW); Chi-Ming Chen, Kaohsiung City (TW)

(73) Assignee: TAIWAN FU HSING INDUSTRIAL CO., LTD., Kaohsiung City (TW)

( * ) Notice: Subject to any disclaimer, the term of this patent is extended or adjusted under 35 U.S.C. 154(b) by 143 days.

(21) Appl. No.: 18/814,605

(22) Filed: Aug. 26, 2024

(65) Prior Publication Data

US 2026/0028854 A1 Jan. 29, 2026

(30) Foreign Application Priority Data

Jul. 23, 2024 (TW) ................................ 113127539

(51) Int. Cl.
*E05B 47/00* (2006.01)
*E05B 15/00* (2006.01)
*E05B 47/06* (2006.01)

(52) U.S. Cl.
CPC ...... *E05B 15/0086* (2013.01); *E05B 47/0012* (2013.01); *E05B 2047/0026* (2013.01); *E05B 2047/0084* (2013.01)

(58) Field of Classification Search
CPC ..... E05B 2047/0017; E05B 2047/0026; E05B 2047/003; E05B 2047/0084; E05B 2047/0085; E05B 2047/0091; E05B 47/0012; E05B 47/02; E05B 47/026; E05B 47/0638; E05B 47/068; E05B 13/005; E05B 13/101
See application file for complete search history.

(56) References Cited

U.S. PATENT DOCUMENTS 2,729,485 A * 1/1956 Schlage .................. E05B 3/065 267/180
3,939,679 A * 2/1976 Barker .................. F41A 17/063 341/181

(Continued)

FOREIGN PATENT DOCUMENTS

CN 204850758 U 12/2015
CN 107893574 A 4/2018

(Continued)

*Primary Examiner* — Carlos Lugo
(74) *Attorney, Agent, or Firm* — Winston Hsu

(57) ABSTRACT

An electric lock has a lock cylinder operable with a key. The lock cylinder has a latch drive lever extending along an axis. A clutch mechanism of the electric lock includes a fixed base fixedly connected to the lock cylinder, a rotatable knob rotatable on the fixed base, a clutch part movable along the axis and rotatable about the axis on the fixed base, a linkage part rotatable about the axis on the fixed base, and a driving device. The clutch part can drive the latch drive lever to rotate. The linkage part and the clutch part are against each other along the axis. The driving device is coupled with the linkage part so as to drive the linkage part to rotate about the axis, so that the clutch part is moved along the axis to be engaged with or disengaged from the rotatable knob.

17 Claims, 13 Drawing Sheets

(56) References Cited

U.S. PATENT DOCUMENTS

| | | | | |
|---|---|---|---|---|
| 5,058,404 | A * | 10/1991 | Fish | E05B 37/16 70/315 |
| 5,150,592 | A * | 9/1992 | Lin | E05B 13/101 70/381 |
| 5,718,468 | A * | 2/1998 | Qureshi | E05B 63/0056 292/357 |
| 6,021,654 | A * | 2/2000 | McCaa | E05B 55/005 292/336.3 |
| 6,807,834 | B2 * | 10/2004 | Tsai | E05B 47/068 70/279.1 |
| 7,007,526 | B2 * | 3/2006 | Frolov | E05B 47/068 70/277 |
| 8,490,445 | B2 * | 7/2013 | Chiou | E05B 47/0012 70/279.1 |
| 8,931,315 | B2 * | 1/2015 | Frolov | G07C 9/00174 70/279.1 |
| 9,303,433 | B2 * | 4/2016 | Chiou | E05B 49/00 |
| 10,385,588 | B2 * | 8/2019 | Huang | E05B 47/0012 |
| 10,597,900 | B2 * | 3/2020 | Holman | E05B 3/04 |
| 10,597,902 | B2 * | 3/2020 | Guo | E05B 17/045 |
| 11,585,116 | B2 * | 2/2023 | Riley | E05B 3/065 |
| 11,761,243 | B2 * | 9/2023 | Lien | E05B 47/068 70/278.7 |
| 2007/0169525 | A1 * | 7/2007 | Chang | E05B 47/068 70/472 |
| 2008/0121001 | A1 | 5/2008 | Huang | |
| 2018/0135335 | A1 * | 5/2018 | Huang | E05B 47/0012 |
| 2020/0332559 | A1 * | 10/2020 | Yen | E05B 47/0012 |
| 2021/0222458 | A1 | 7/2021 | Jones | |
| 2024/0218704 | A1 * | 7/2024 | Caterino | E05B 47/068 |

FOREIGN PATENT DOCUMENTS

| | | | | |
|---|---|---|---|---|
| EP | 3 995 650 | | 5/2022 | |
| FR | 3004207 | A1 * | 10/2014 | E05B 15/004 |
| GB | 923017 | A * | 4/1963 | E05B 3/065 |
| GB | 2095788 | A * | 10/1982 | E05B 3/065 |
| GB | 2150629 | A * | 7/1985 | E05B 3/065 |
| TW | I560350 | B | 12/2016 | |
| TW | I593866 | B | 8/2017 | |
| TW | I663316 | B | 6/2019 | |
| TW | M611993 | U | 5/2021 | |
| TW | I796105 | B | 3/2023 | |
| WO | WO-2006120271 | A1 * | 11/2006 | E05B 47/0676 |
| WO | 2017/220078 | A1 | 12/2017 | |

* cited by examiner

ELECTRIC LOCK AND CLUTCH MECHANISM THEREOF

BACKGROUND OF THE INVENTION

1. Field of the Invention

The present invention relates to an electric lock, and more particularly to an electric lock with a lock cylinder operable with a key and a clutch mechanism thereof.

2. Description of the Prior Art

At present, some electric locks, in electric operation modes, will drive a gear through a motor so as to drive a latch to extend or retract, which consumes a lot of power and affects the battery life. In addition, for some electric locks, when users want to lock the door from the outside, they still need to use a key to operate the electric lock, which is quite inconvenient.

SUMMARY OF THE INVENTION

In view of the problems in the prior art, an objective of the invention is to provide a clutch mechanism used in an electric lock. The clutch mechanism allows a rotatable knob to be engaged with a clutch part, so that users can manually rotate the rotatable knob to drive a latch drive lever of the electric lock to rotate.

A clutch mechanism of an embodiment according to the invention is used in an electric lock. The electric lock has a lock cylinder operable with a key. The lock cylinder has a latch drive lever. The latch drive lever extends along an axis and is rotatable with the axis as the center of rotation. The clutch mechanism of the electric lock includes a fixed base, a rotatable knob, a clutch part, a linkage part, and a driving device. The fixed base is fixedly connected to the lock cylinder. The rotatable knob is rotatably disposed on the fixed base. The rotatable knob has a first engagement portion. The clutch part is disposed movably along the axis and rotatably about the axis on the fixed base. The clutch part has a driving hole, a second engagement portion, and a first cam surface. The latch drive lever passes through the driving hole. The driving hole has a first pushing portion and a second pushing portion. The clutch part rotates the latch drive lever in a first rotation direction through the first pushing portion; the clutch part rotates the latch drive lever in a second rotation direction through the second pushing portion. The first rotation direction is opposite to the second rotation direction. The first pushing portion and the second pushing portion do not abut against the latch drive lever at the same time. The linkage part is disposed rotatably about the axis on the fixed base. The linkage part has a second cam surface. The linkage part is adjacent to the clutch part along the axis. The first cam surface and the second cam surface abut against each other. The driving device is coupled to the linkage part. The driving device drives the linkage part to rotate about the axis. Therein, the driving device drives the linkage part to rotate to make the first cam surface and the second cam surface to slide relative to each other, so that the clutch part moves along the axis to make the second engagement portion to be engaged with or disengaged from the first engagement portion. Thereby, after the clutch part is engaged with the rotatable knob, the user can manually rotate the rotatable knob to drive the clutch part to rotate the latch drive lever to switch the status of the latch drive lever, such as from a locked state to an unlocked state, or from the unlocked state to the locked state. This state switching process uses no electricity and helps save energy. Furthermore, this state switching process includes a locking operation and does not require the operation of a physical key, which increases the convenience of the locking operation.

Another objective of the invention is to provide an electric lock which includes a lock cylinder and the aforementioned clutch mechanism. Similarly, after the clutch part is engaged with the rotatable knob, the electric lock allows the user to manually rotate the rotatable knob to drive the clutch part to rotate the latch drive lever to switch the status of the latch drive lever. Therefore, the electric lock does not use electricity during the aforementioned state switching process, which helps save energy. Furthermore, the locking operation in the aforementioned state switching process does not require the operation of a physical key, which increases the convenience of the locking operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
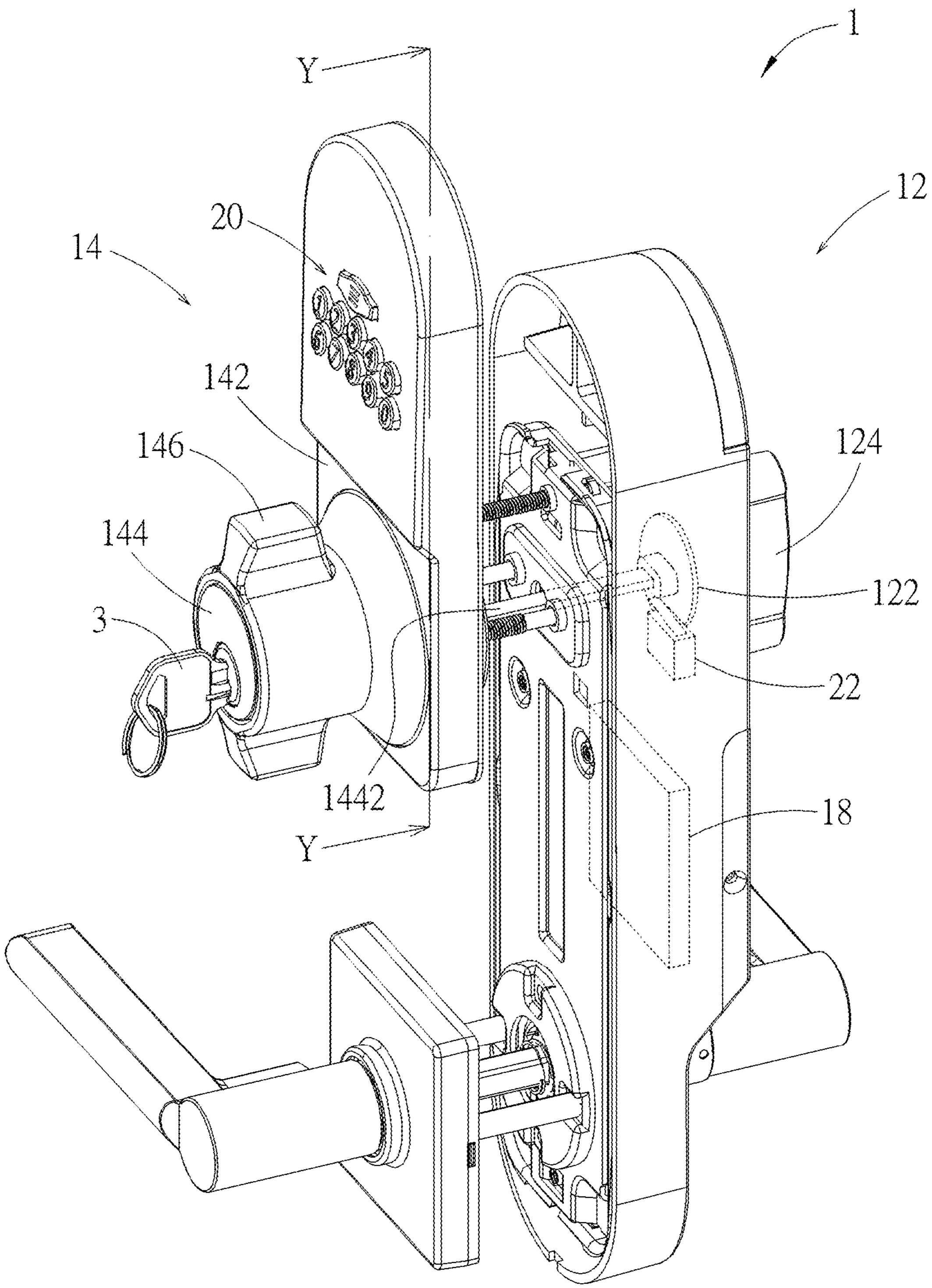
FIG. 1 is a schematic diagram illustrating an electric lock according to a first embodiment.
Figure 2:
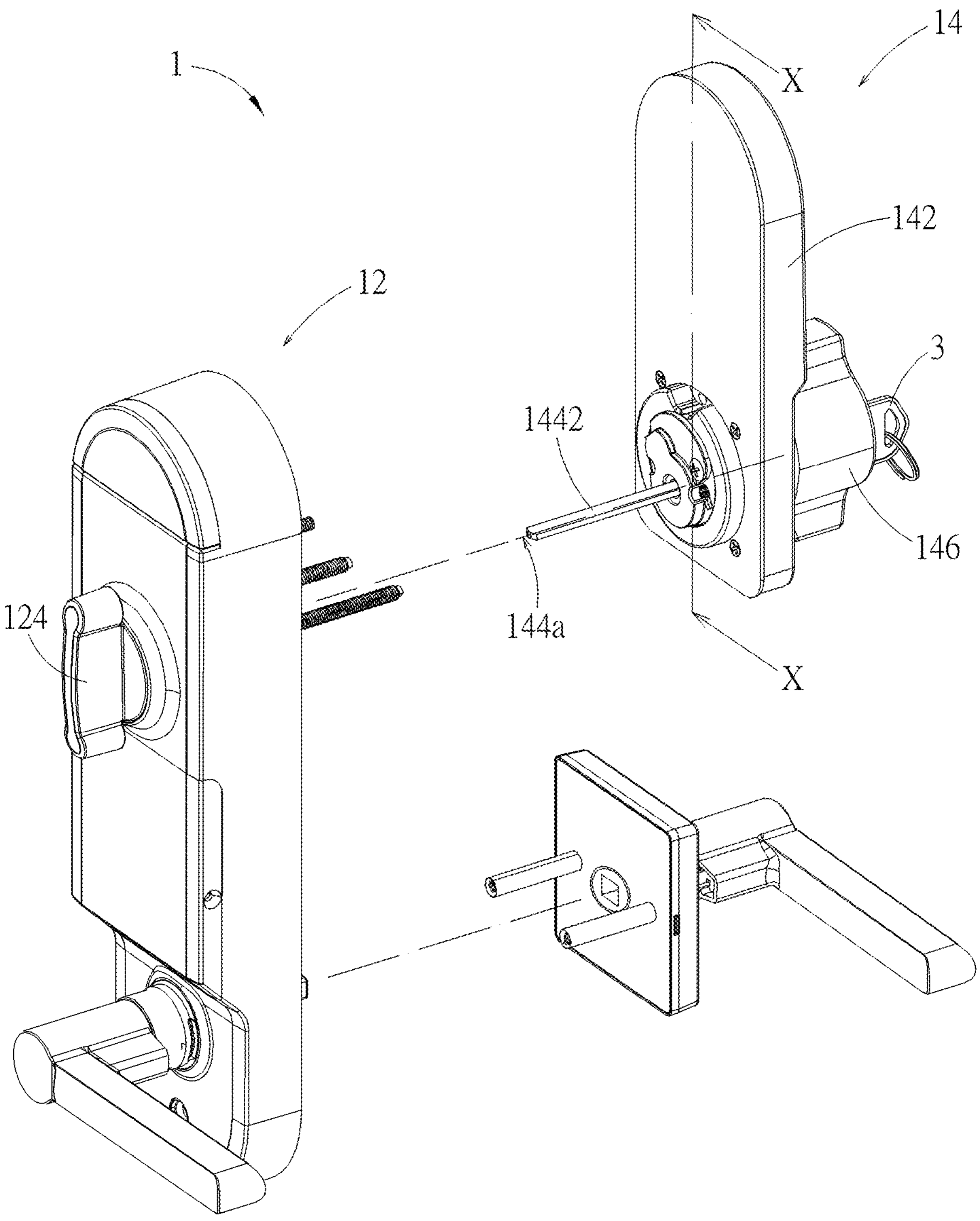
FIG. 2 is a partially-exploded view of the electric lock in FIG. 1.

Please refer to FIG. 1 and FIG. 2. An electric lock 1 according to an embodiment includes an inner lock body 12 and an outer lock body 14. In practice, the electric lock 1 is installed on a door panel (not shown in the figures) and connected with a latch assembly (not shown in the figures) on the door panel to drive the latch of the latch group. The outer lock body 14 is located outside the door panel, and the inner lock body 12 is located inside the door panel.

Figure 3:
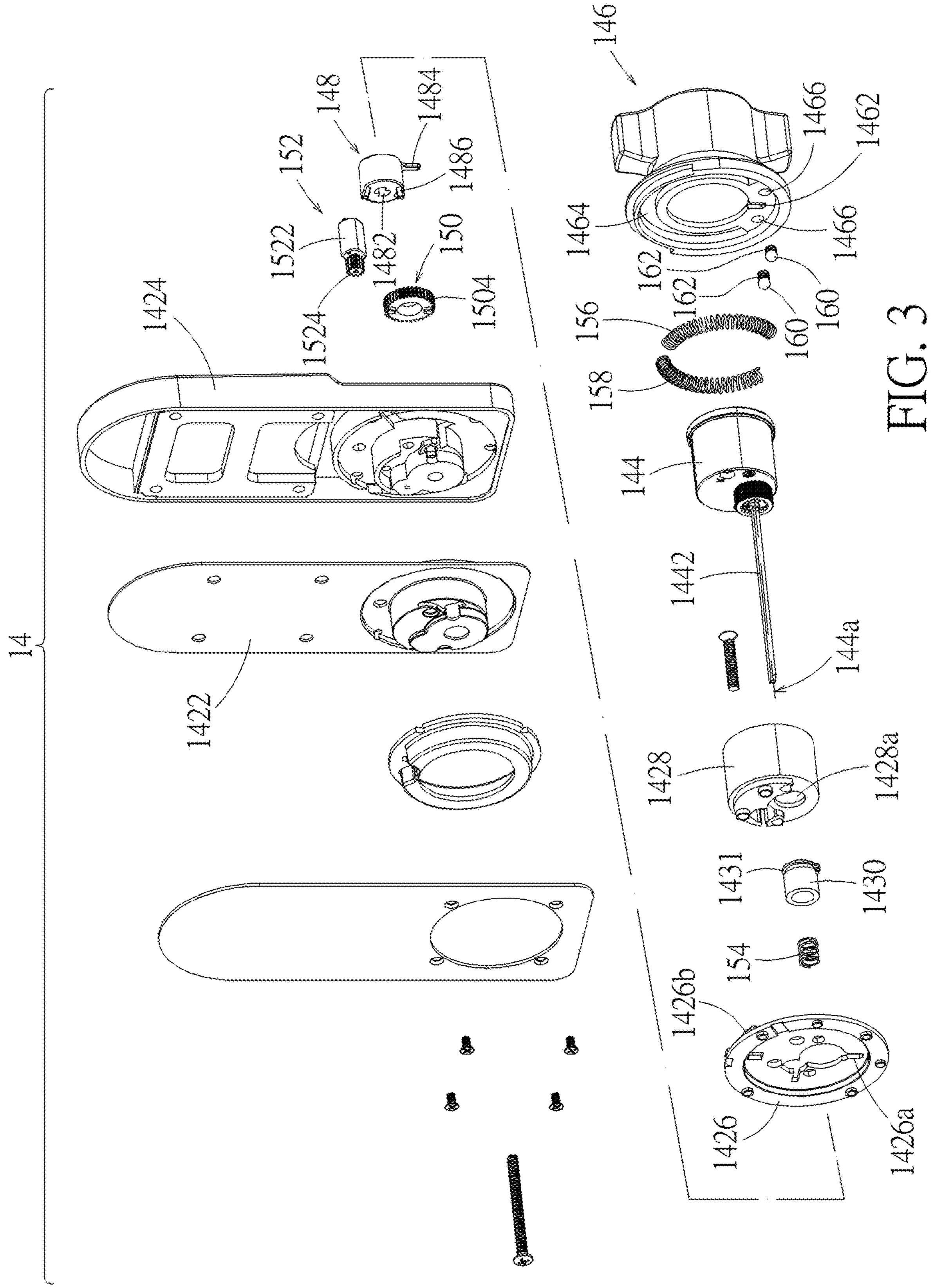
FIG. 3 is an exploded view of an outer lock body of the electric lock in FIG. 2.
Figure 4:
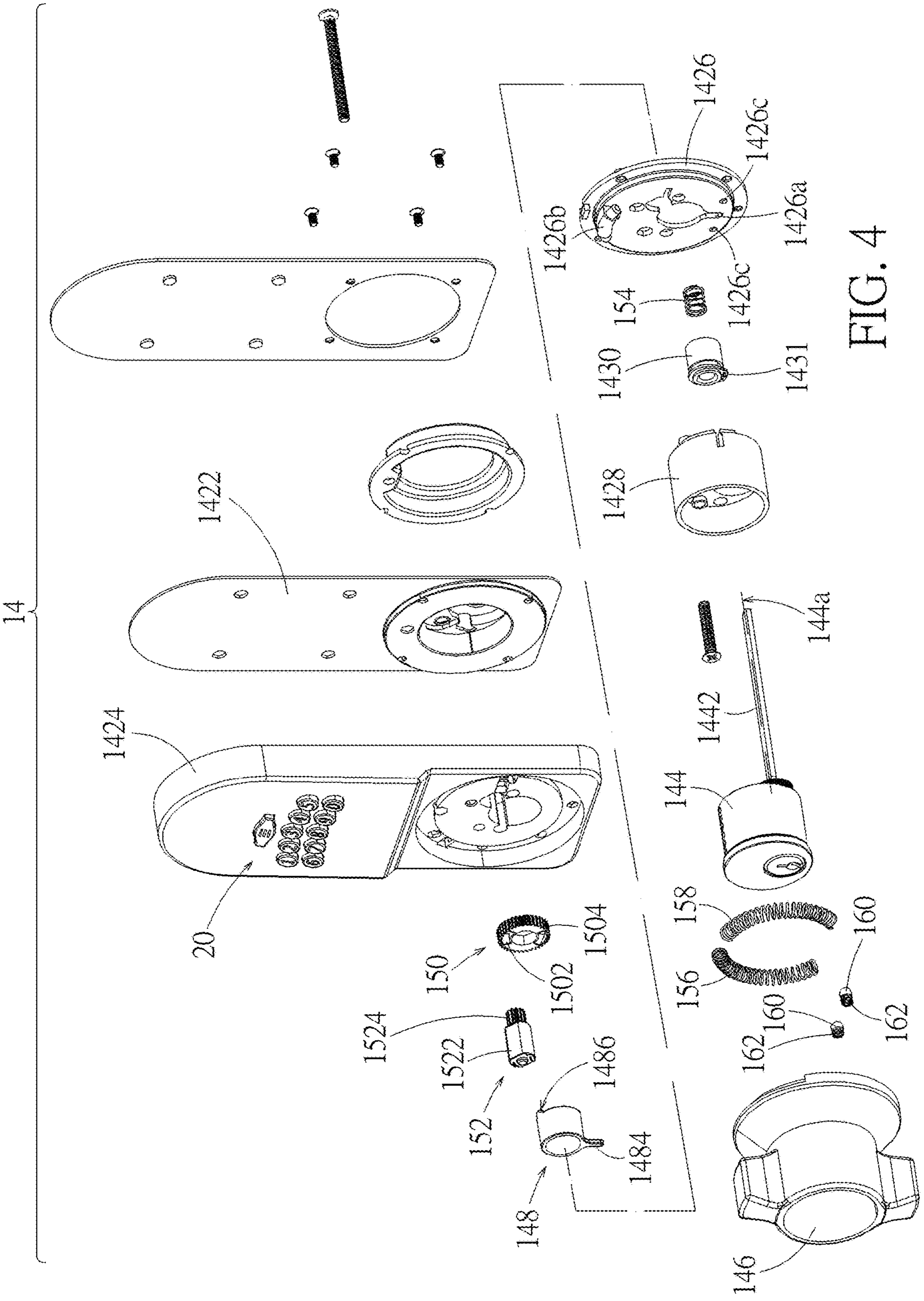
FIG. 4 is a schematic diagram of the outer lock body in FIG. 3 in another viewpoint.
Figure 5:
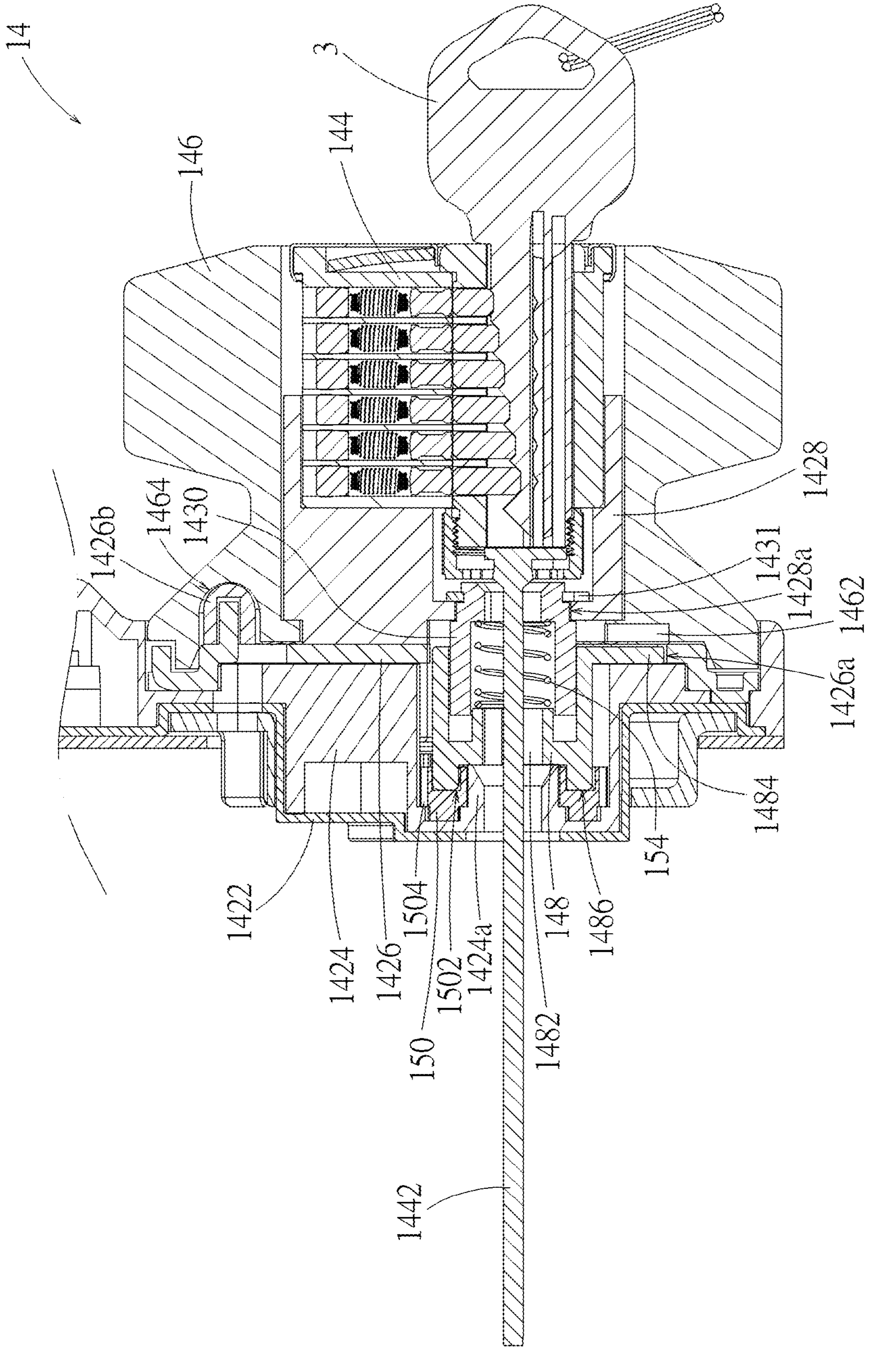
FIG. 5 is a sectional view of an outer lock body of the electric lock along the line X-X in FIG. 2.

Please also refer to FIG. 3 to FIG. 5. The outer lock body 14 includes a fixed base 142, a lock cylinder 144, a rotatable knob 146, a clutch part 148, a linkage part 150, and a driving device 152. The fixed base 142 mainly includes a base plate 1422, an outer cover 1424 combined with the base plate 1422, a fixing plate 1426 fixed on the outer cover 1424, a lock cylinder socket 1428 fixed on the fixing plate 1426, and a supporting sleeve 1430 combined with the lock cylinder socket 1428. Therein, the lock cylinder socket 1428 has a through hole 1428*a*. The supporting sleeve 1430 is held in the through hole 1428*a* by a circle 1431. The lock cylinder 144 is accommodated and fixed in the lock cylinder socket 1428, so that the fixed base 142 and the lock cylinder 144 are fixedly connected. The lock cylinder 144 has a latch drive lever 1442. The latch drive lever 1442 extends along an axis 144*a* (shown by a chain line in the figures) and through the supporting sleeve 1430. The latch drive lever 1442 is rotatable about the axis 144*a*. The lock cylinder 144 is operable with a key 3. Rotating the key 3 can switch the latch drive lever 1442 between a locked state and an unlocked state. In the embodiment, the latch drive lever 1442 is in the shape of a long plate. In practice, when connecting the latch drive lever 1442 to the latch assembly provided on the door (in the direction toward the lock hole of the lock cylinder 144, i.e., the direction toward the door when a person is outside the door), if the latch is located on the left side (for example, installed on a left-hand door), set the plate structure of the latch drive lever 1442 vertically (in practice, one side of the latch drive lever 1442 may be marked with "L-UP" and an arrow which points upward at this time), and then insert it a cross hole of the latch assembly; if the latch is located on the right side (for example, installed on a right-hand door), set the plate structure of the latch drive lever 1442 is set horizontally (or rotate the vertical latch drive lever 1442 90 degrees; similarly, the other side of the latch drive lever 1442 may be marked with "R-UP" which faces up at this time), and then insert it into the cross hole of the latch assembly. In other words, the electronic lock 1 can be used for left-hand and right-hand doors.

Furthermore, the rotatable knob 146 is rotatably sleeved on the lock cylinder socket 1428, so that the rotatable knob 146 is rotatably disposed on the fixed base 142. The fringe of the rotatable knob 146 is also rotatably sleeved on the fringe of the fixing plate 1426. The clutch part 148 is rotatably sleeved on the supporting sleeve 1430 and can move along the axis 144*a*, so that the clutch part 148 is disposed on the fixed base 142 and is movable along the axis 144*a* and rotatable about the axis 144*a*. The clutch part 148 and the rotatable knob 146 are selectively engaged or disengaged to achieve the clutch action between the two. The linkage part 150 is rotatably sleeved on a shaft barrel 1424*a* of the outer cover 1424, so that the linkage part 150 is disposed on the fixed base 142 and is rotatable about the axis 144*a*. The linkage part 150 is adjacent to the clutch part 148 along the axis 144*a*, and the linkage part 150 and the clutch part 148 abut against each other along the axis 144*a*. The driving device 152 is fixed on the outer cover 1424 and is coupled with the linkage part 150. The driving device 152 can drive the linkage part 150 to rotate about the axis 144*a*.

Figure 9:
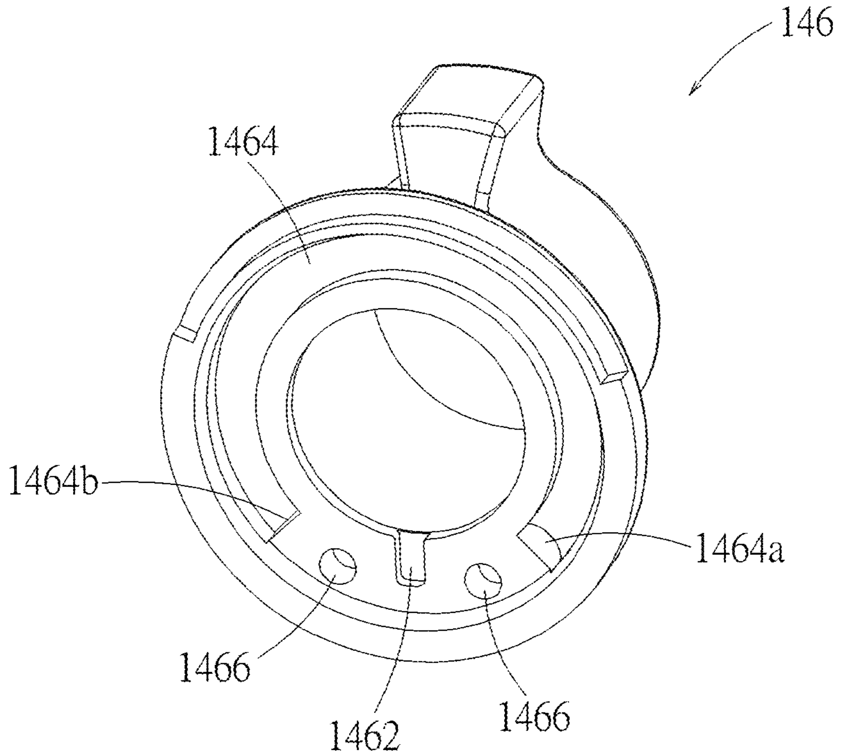
FIG. 9 is a schematic diagram illustrating a rotatable knob of the clutch mechanism of the electric lock.

Please refer to FIG. 3 to FIG. 5. Further, the rotatable knob 146 has a first engagement portion 1462 (see also FIG. 9). The clutch part 148 has a driving hole 1482 and a second engagement portion 1484 (see also FIG. 6 and FIG. 7). The latch drive lever 1442 (shown by dashed lines in FIG. 6 and FIG. 7) passes through the driving hole 1482 and is structurally constrained by the driving hole 1482, so that when the clutch part 148 rotates, the latch drive lever 1442 can be rotated through the driving hole 1482, thereby changing the status of the latch drive lever 1442. After the clutch part 148 moves along the axis 144*a* to engage the second engagement portion 1484 with the first engagement portion 1462 (as shown by FIG. 5), the rotatable knob 146 will rotate together with the clutch part 148. At this time, the user can change the status of the latch drive lever 1442 by rotating the rotatable knob 146. After the clutch part 148 moves along the axis 144*a* to disengage the second engagement portion 1484 from the first engagement portion 1462, the rotatable knob 146 and the clutch part 148 are no longer linked. Now even if the user rotates the rotatable knob 146, the status of the latch drive lever 1442 will not change. In the embodiment, the first engagement portion 1462 is a recess. The second engagement portion 1484 is a protrusion (protruding and extending perpendicular to the axis 144*a*, or radially protruding and extending). The protrusion snaps into the recess to achieve the engagement between the second engagement portion 1484 and the first engagement portion 1462. In practice, the first engagement portion 1462 can be modified as a protrusion, and the second engagement portion 1484 can be modified as a recess correspondingly. In addition, the first engagement portion 1462 and the second engagement portion 1484 can also be realized by other structures to achieve the engage and disengage status, which will not be described in addition.

Figure 6:
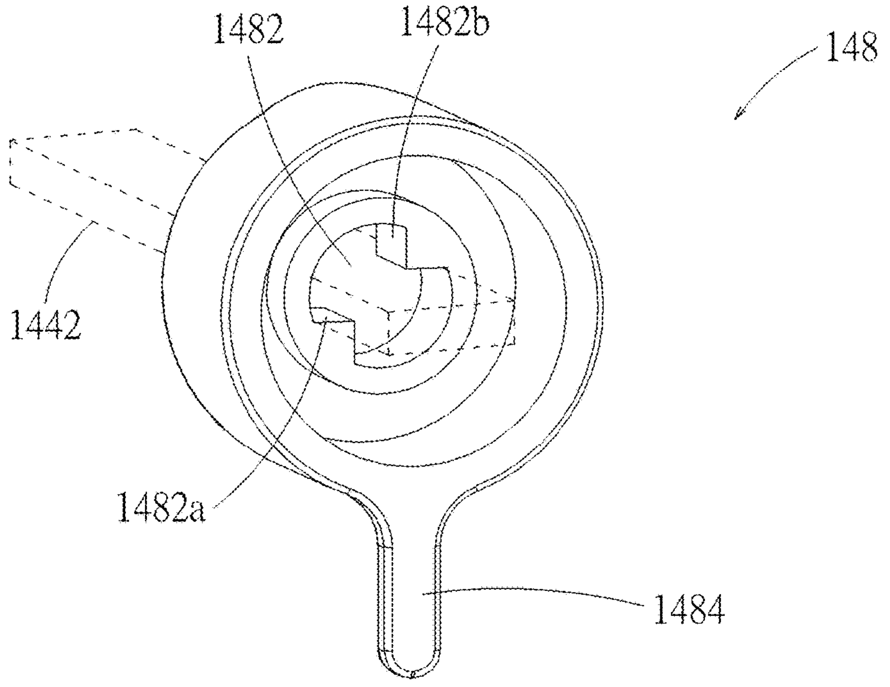
FIG. 6 is a schematic diagram illustrating a clutch part of a clutch mechanism of the electric lock.
Figure 7:
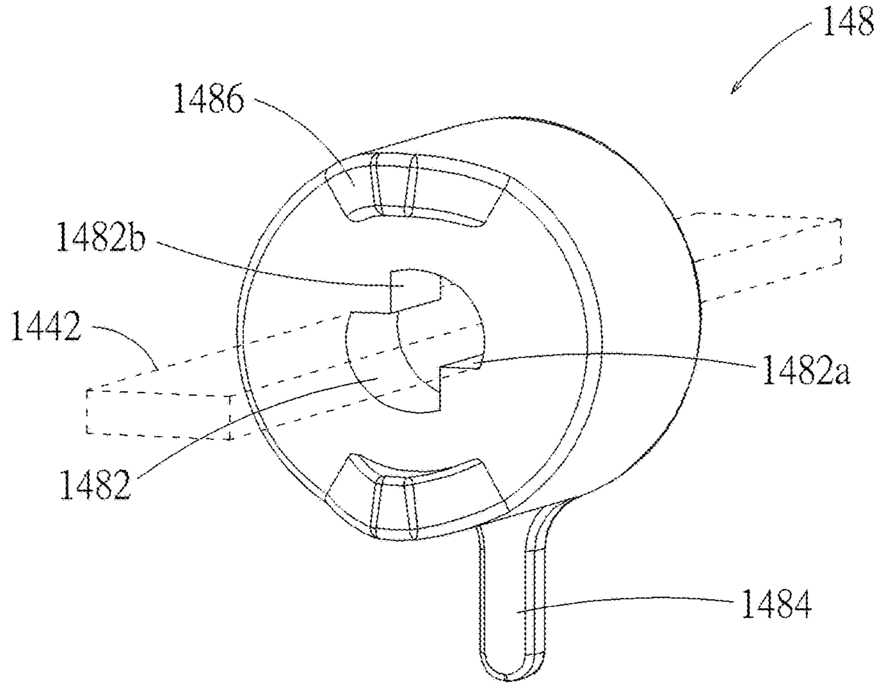
FIG. 7 is a schematic diagram of the clutch part in FIG. 6 in another viewpoint.

Furthermore, the clutch part 148 has a first cam surface 1486 (see also FIG. 6 and FIG. 7). The linkage part 150 has a second cam surface 1502 (see also FIG. 8). The first cam surface 1486 and the second cam surface 1502 are disposed opposite to each other. In the embodiment, a spring 154 is compressedly disposed between the supporting sleeve 1430 and the clutch part 148 to push the clutch part 148 to keep the first cam surface 1486 against the second cam surface 1502. In practice, the first cam surface 1486 and the second cam surface 1502 can also be kept in contact with each other in other ways; for example, the spring 154 is instead disposed between the linkage part 150 and the outer cover 1424 to push the linkage part 150 toward the clutch part 148. The first cam surface 1486 and the second cam surface 1502 abut against each other, so that when the clutch part 148 and the linkage part 150 rotate relative to each other, the first cam surface 1486 and the second cam surface 1502 will slide relative to each other, so that the clutch part 148 is moved along the axis 144*a* relative to the linkage part 150, thereby realizing the clutch action of the clutch part 148 (or the second engagement portion 1484 thereof) and the rotatable knob 146 (or the first engagement portion 1462 thereof). In addition, the fixing plate 1426 of the fixed base 142 has a third engagement portion 1426*a*. When the clutch part 148 (or the second engagement portion 1484 thereof) and the rotatable knob 146 (or the first engagement portion 1462 thereof) are disengaged, the clutch part 148 (or the second engagement portion 1484 thereof) and the fixing plate 1426 (or the third engagement portion 1426*a* thereof) are engaged. This structural configuration helps the first cam surface 1486 and the second cam surface 1502 to effectively slide relative to each other.

Figure 8:
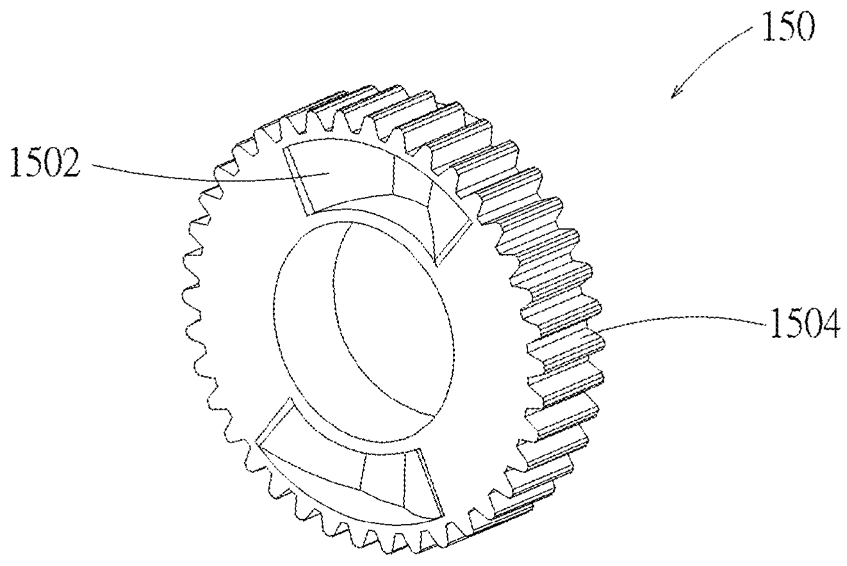
FIG. 8 is a schematic diagram illustrating a linkage part of the clutch mechanism of the electric lock.

Furthermore, the linkage part 150 has an external teeth 1504 (see also refer to FIG. 8). The driving device 152 includes a motor 1522 and a pinion 1524 fixed on an output shaft of the motor 1522. The pinion 1524 meshes with the external teeth 1504. Therefore, the driving device 152 can drive the linkage part 150 to rotate through the pinion 1524 to make the first cam surface 1486 and the second cam surface 1502 to slide relatively, so that the clutch part 148 moves along the axis 144*a* to make the second engagement portion 1484 to be engaged with or disengaged from the first engagement portion 1462; that is, the clutch part 148 is moved along the axis 144*a* to make the second engagement portion 1484 to be disengaged from the first engagement portion 1462 and engaged with the third engagement portion 1426*a*, or to make the second engagement portion 1484 disengaged from the third engagement portion 1426*a* and engaged with the first engagement portion 1462.

Please refer FIG. 3, FIG. 4, FIG. 9 and FIG. 10. Therein, in FIG. 10, in order to facilitate the observation of the outline of the driving hole 1482 of the clutch part 148, the lock cylinder socket 1428, the supporting sleeve 1430 and the spring 154 are not shown in the figure; in addition, the axis 144*a* is indicated by a cross mark in the figure. The fixing plate 1426 of the fixed base 142 has a spring limitation portion 1426*b*. The rotatable knob 146 has an arc-shaped recess 1464. The arc-shaped recess 1464 extends around the axis 144*a*. The spring limitation portion 1426*b* is accommodated in the arc-shaped recess 1464. A first spring 156 is accommodated in the arc-shaped recess 1464 and compressedly disposed between the spring limitation portion 1426*b* and a first end 1464*a* of the arc-shaped recess 1464. A second spring 158 is accommodated in the arc-shaped recess 1464 and compressedly disposed between the spring limitation portion 1426*b* and a second end 1464*b* of the arc-shaped recess 1464. Therein, in FIG. 10, the first spring 156 and the second spring 158 are showed by thick solid polylines to simplify the drawing. When the rotatable knob 146 rotates, the degree of compression of the first spring 156 and the second spring 158 will change. When the external force for rotating the rotatable knob 146 disappears, the first spring 156 and the second spring 158 will tend to return to the initial status, thus having the effect of resetting the rotatable knob 146.

Furthermore, the fixing plate 1426 of the fixed base 142 has two positioning holes 1426*c*. The rotatable knob 146 has two accommodating holes 1466 correspondingly. Each accommodating hole 1466 has an opening and a closed end. Corresponding to each accommodating hole 1466, a positioning bead 160 is movably disposed in the accommodating hole 1466, and a spring 162 is compressedly disposed in the accommodating hole 1466 and is located between the positioning bead 160 and the closed end. The spring 162 pushes against the positioning bead 160 to move outward to snap into the corresponding positioning hole 1426*c*. This structural configuration helps to keep the rotatable knob 146 in place.

Figure 10:
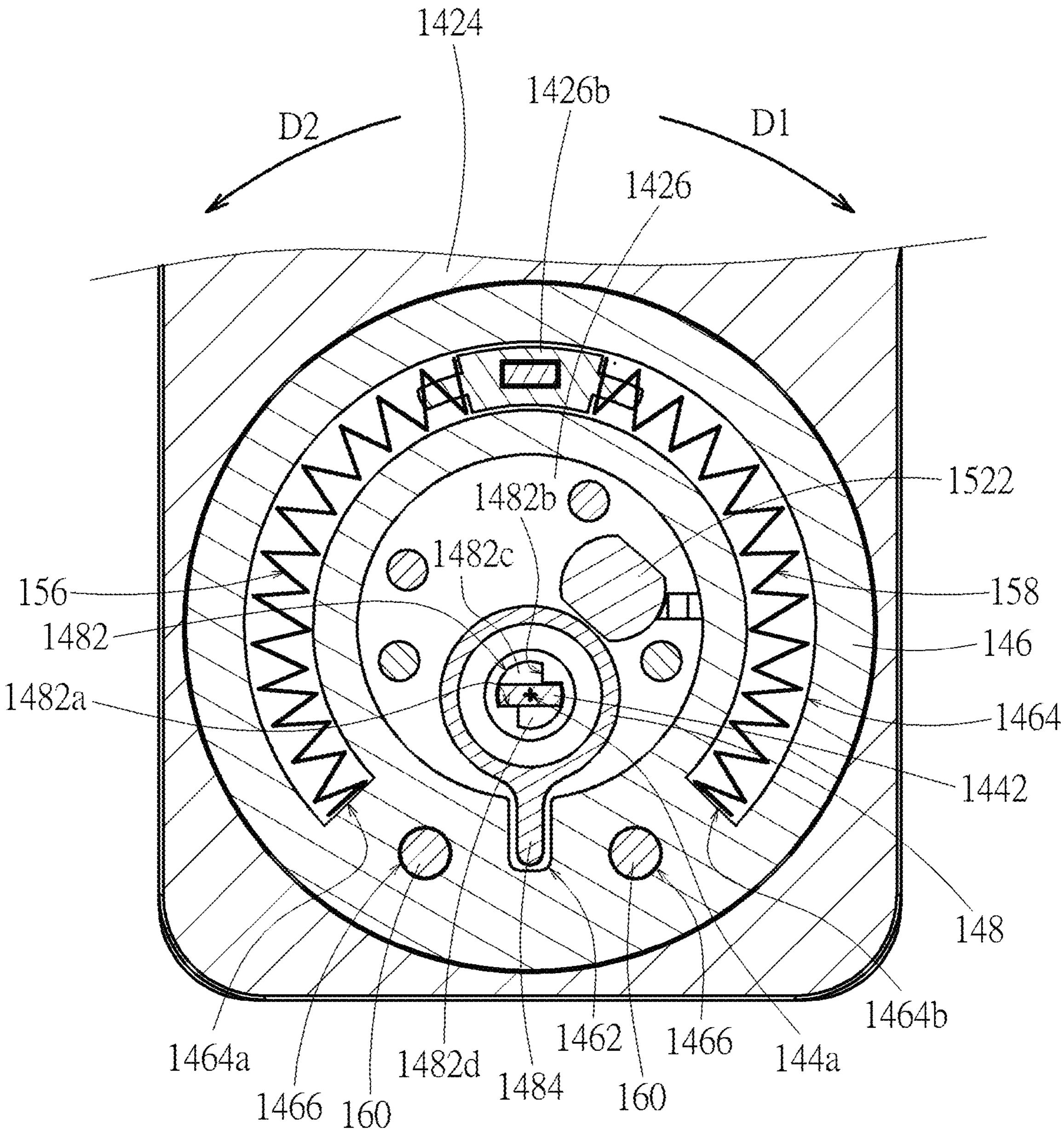
FIG. 10 is a sectional view of the outer lock body of the electric lock along the line Y-Y in FIG. 1.
Figure 11:
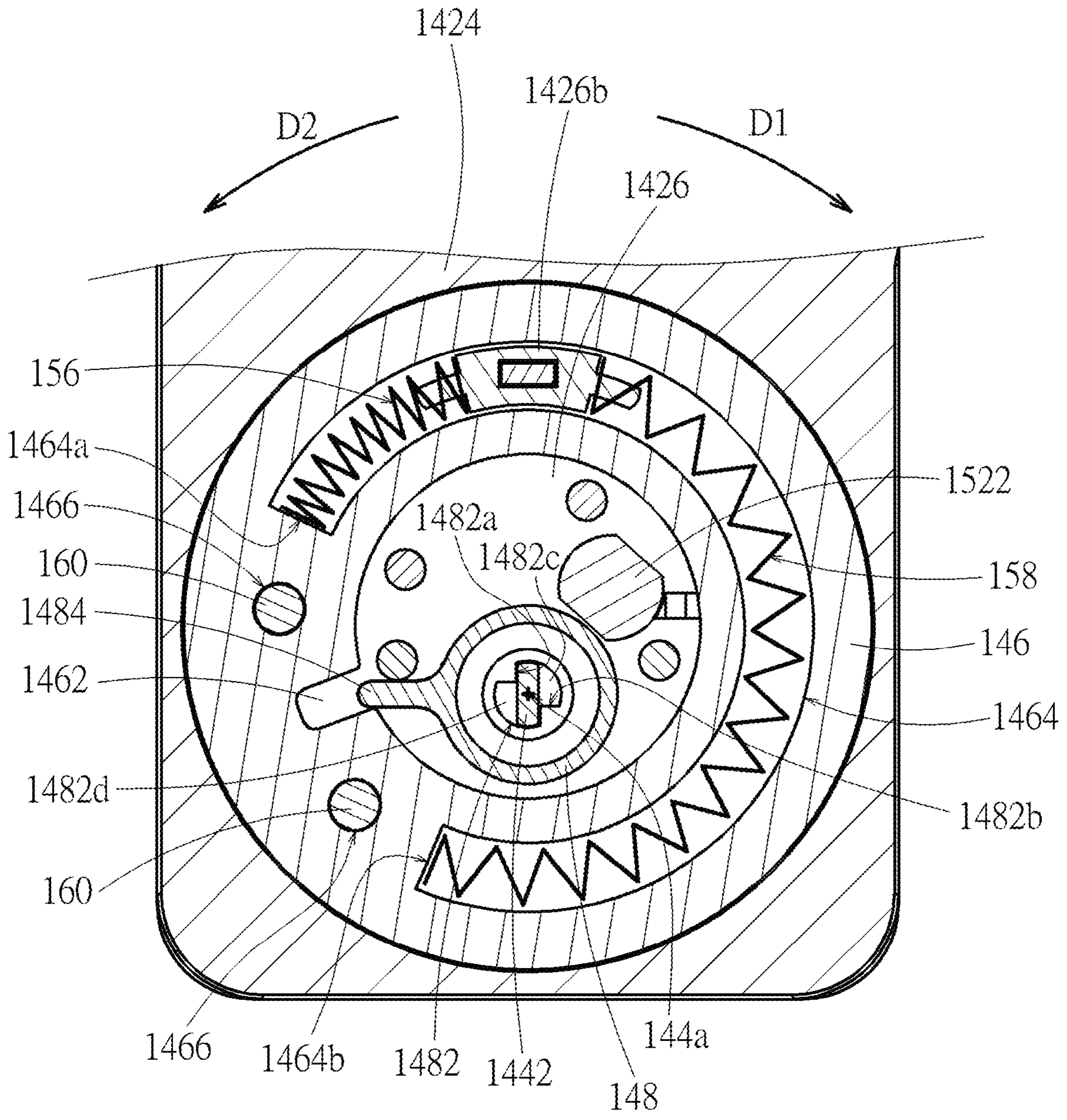
FIG. 11 is a sectional view of the rotatable knob in FIG. 10 after the rotatable knob drives the clutch part to rotate clockwise.
Figure 12:
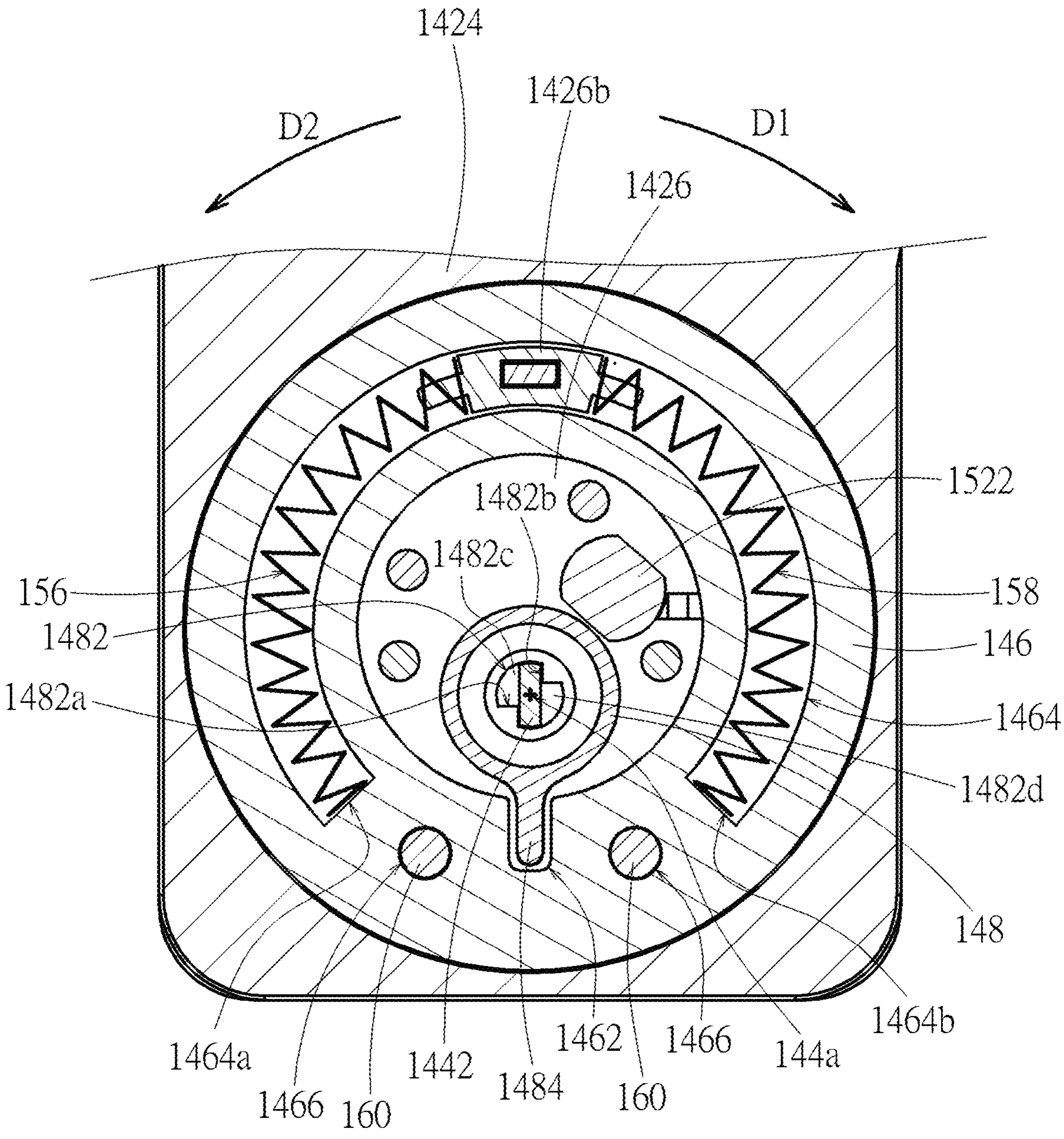
FIG. 12 is a sectional view of the rotatable knob in FIG. 11 after the rotatable knob drives the clutch part to rotate counterclockwise under a condition that external force exerted on the rotatable knob disappears.

Please refer to FIG. 3, FIG. 4, FIG. 6, FIG. 7 and FIG. 10. The driving hole 1482 of the clutch part 148 is a non-circular hole. The driving hole 1482 has a first pushing portion 1482*a* and a second pushing portion 1482*b*. The clutch part 148 rotates the latch drive lever 1442 in different directions through the first pushing portion 1482*a* and the second pushing portion 1482*b*. As shown by FIG. 10 (for example, the latch drive lever 1442 is in the unlocked state at this time), the clutch part 148 can rotate the latch drive lever 1442 in a first rotation direction D1 (i.e., the clockwise direction from the viewpoint of FIG. 10) through the first pushing portion 1482*a* (for example, the user rotates the rotatable knob 146 combined with the clutch part 148) until the latch drive lever 1442 is in the locked state (for example, after rotating 90 degrees, as shown by FIG. 11). As shown by FIG. 11, at this time, the first spring 156 is further compressed and the second spring 158 is stretched. If the external force to rotate the rotatable knob 146 disappears at this time, under the resilient effect of the first spring 156 and the second spring 158, the rotatable knob 146 will drive the clutch part 148 to rotate counterclockwise together back to the original position, as shown by FIG. 12. At this time, the latch drive lever 1442 remains in the locked state. Furthermore, in the embodiment, the clutch part 148 rotates coaxially with the latch drive lever 1442, and the clutch part 148 rotates non-coaxially with the rotatable knob 146. As shown by FIG. 11, the rotatable knob 146 only needs to rotate about 45 degrees (this angle can also be set in practice by designing the relative arrangement relationship between the rotatable knob 146 and the clutch part 148) to make the clutch part 148 (together with the latch drive lever 1442) to rotate 90 degrees. This structural configuration facilitates the user's locking (or unlocking) operation.

Figure 13:
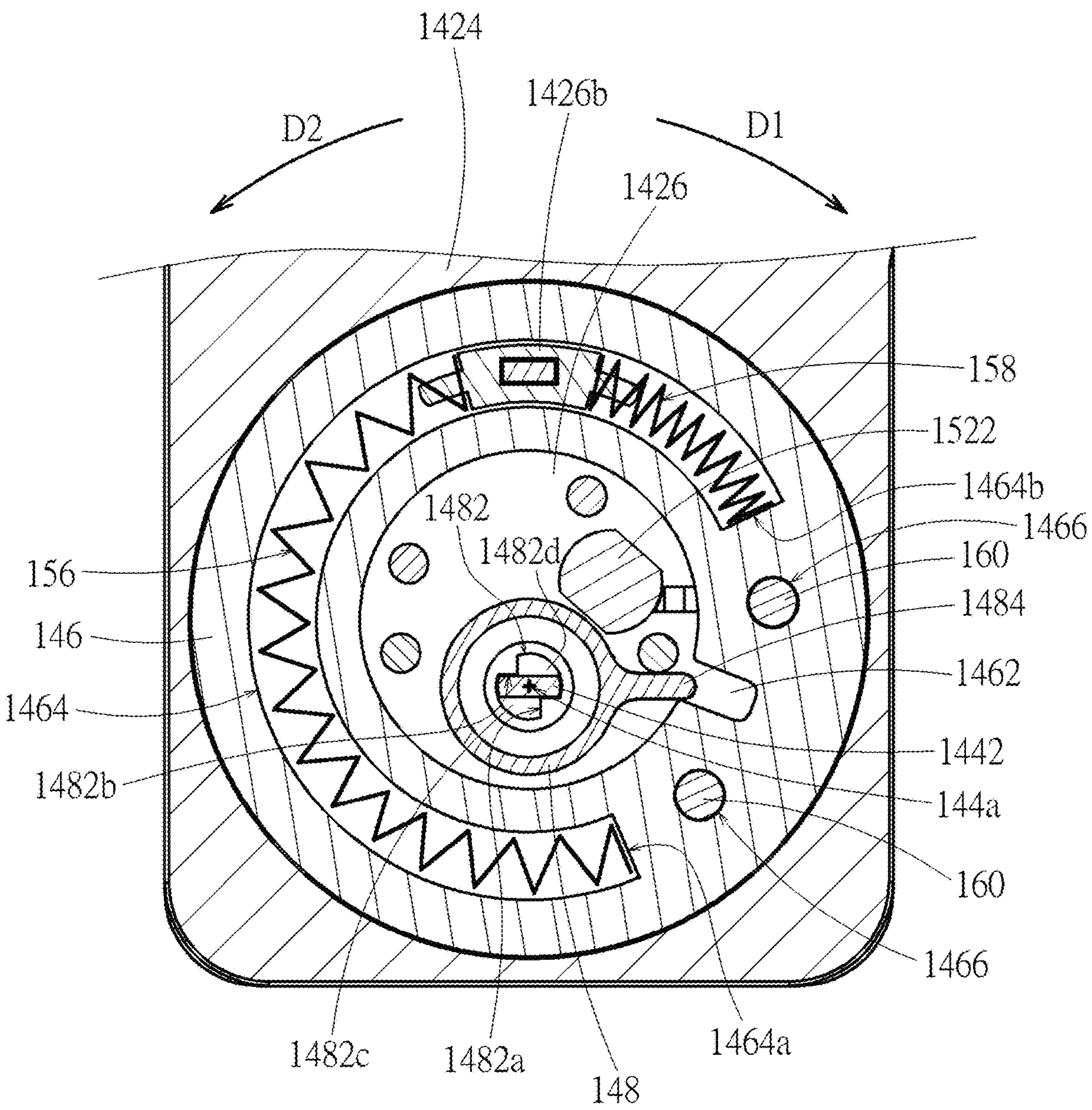
FIG. 13 is a sectional view of the rotatable knob in FIG. 12 after the rotatable knob drives the clutch part to rotate counterclockwise.

Afterward, if the rotatable knob 146 is engaged with the clutch part 148, the user can rotate the rotatable knob 146 clockwise to make the clutch part 148 to rotate in a second rotation direction D2 (i.e., the counterclockwise direction from the viewpoint of FIG. 12, opposite to the first rotation direction D2) until the latch drive lever 1442 is in the unlocked state (for example, after rotating 90 degrees, as shown in FIG. 13). As shown FIG. 13, at this time, the second spring 158 is further compressed and the first spring 156 is stretched. If the external force to rotate the rotatable knob 146 disappears at this time, under the resilient effect of the first spring 156 and the second spring 158, the rotatable knob 146 will drive the clutch part 148 to rotate counterclockwise together back to the original position (equivalent to the status shown by FIG. 10). At this time, the latch drive lever 1442 remains in the unlocked state.

Furthermore, as shown by FIG. 10 to FIG. 13, the first pushing portion 1482*a* and the second pushing portion 1482*b* will not abut against the latch drive lever 1442 at the same time; in other words, the latch drive lever 1442 can still rotate to a certain angle when the clutch part 148 does not rotate. In the embodiment, the latch drive lever 1442 is free to rotate 90 degrees relative to the clutch part 148. Taking FIG. 10 as an example, at this time, the latch drive lever 1442 can be rotated clockwise relative to the clutch part 148 (for example, the user inserts the lock cylinder 144 with the key 3 and rotates it), so that the latch drive lever 1442 is switched from the unlocked state (as shown by FIG. 10) to the locked state (as shown by FIG. 12). Similarly, taking FIG. 12 as an example, at this time, the latch drive lever 1442 can be rotated counterclockwise relative to the clutch part 148 (for example, the user inserts the lock cylinder 144 with the key 3 and rotates it), so that the latch drive lever 1442 is switched from the locked state (as shown by FIG. 12) to the unlocked state (as shown by FIG. 10). In other words, the driving hole 1482 of the clutch part 148 allows the latch drive lever 1442 to rotate freely about the axis 144*a* between the locked state and the unlocked state. This structural design facilitates the user to unlock and lock with key 3 alone, and clutch part 148 will not interfere with the above unlocking and locking operations.

Furthermore, taking FIG. 10 as an example, in the embodiment, the driving hole 1482 as a whole includes two sector-shaped portions 1482*c* and 1482*d*. The two sector-shaped portions 1482*c* and 1482*d* are symmetrical with respect to the axis 144*a*. The first pushing portion 1482*a* and the second pushing portion 1482*b* are located on both sides of the sector-shaped portion 1482*c*. When the clutch part 148 pushes the latch drive lever 1442 through the first pushing portion 1482*a* or the second pushing portion 1482*b*, both sides of the other sector-shaped portion 1482*d* will also push the latch drive lever 1442 at the same time. This structural configuration helps to increase the stability of the driving hole 1482 rotating the latch drive lever 1442.

In addition, as shown by FIG. 1, in the embodiment, the electric lock 1 also includes a control module 18 (shown by a dashed box in the figure), an input interface 20 (exposed on the outer lock body 14), and a sensor 22 (shown in dashed lines in the figure). The control module 18 is electrically connected to the motor 1522 (of the driving device 152) (see also FIG. 3 and FIG. 4), the input interface 20, and the sensor 22. The input interface 20 allows users to input data for verification by the control module 18. When the verification is successful, the control module 18 controls the motor 1522 to rotate to drive the linkage part 150 to rotate, so as to make the clutch part 148 is engaged with the rotatable knob 146, so that the user can switch the status of the latch drive lever 1442 by rotating the rotatable knob 146. Similarly, the control module 18 can also control the motor 1522 to rotate to drive the linkage part 150 to rotate, so as to disengage the clutch part 148 from the rotatable knob 146. In practice, it can be designed that after the clutch part 148 is engaged with the rotatable knob 146 for a period of time (e.g., tens of seconds), the motor 1522 is controlled to rotate, so as to disengage the clutch part 148 from the rotatable knob 146; this can prevent the user from forgetting to disengage the clutch part 148 from the rotatable knob 146, causing safety concerns. Furthermore, in the embodiment, the input interface 20 is implemented by buttons, but in practice it is not limited thereto. For example, the input interface 20 is implemented by a touch panel.

Furthermore, the sensor 22 is disposed in the inner lock body 12 and adjacent to the latch drive lever 1442. The sensor 22 is used to sense the status of the latch drive lever 1442. For example, the sensor 22 is realized by a micro switch. The latch drive lever 1442 is connected to a rotary disk 122 (shown in dashed lines in the figure, in which the rotatable knob 124 of the inner lock body 12 is also connected to the rotary disk 122) in the inner lock body 12. The rotary disk 122 has a non-circular cross-section, and the trigger arm of the micro switch is close to the rotary disk 122, so that the rotary disk 122 can trigger the micro switch. Thereby, the control module 18 can sense the status of the latch drive lever 1442 through the sensor 22, and control the operation of the driving device 152 according to the sensing result of the sensor 22. For example, when the control module 18 senses that the latch drive lever 1442 is in the unlocked state through the sensor 22 (for example, when the user wants to go out, the user rotates the rotatable knob 124 of the inner lock body 12 to drive the latch drive lever 1442 to the unlocked state), the control module 18 control the operation of the driving device 152 to engage the clutch part 148 with the rotatable knob 146, which facilitates the user to rotate the rotatable knob 146 from the outside to lock electric 1 lock without entering the corresponding verification data through input interface 20. Furthermore, it can also be designed that the clutch part 148 and the rotatable knob 146 are separated after a predetermined number of seconds, so as to prevent the outer rotatable knob 146 from being in a state where it can be rotated to lock for a long time. In addition, in practice, a biasing elastic piece (not shown in the figure) can be provided in the inner lock body 12 to press against the rotary disk 122; this structural configuration is conducive to stably maintaining the latch drive lever 1442 in the locked state and the unlocked state. Furthermore, the power required by electric lock 1 can be provided by a built-in battery or an external power supply, which will not be described in addition.

In other embodiments, it is practicable to provide the electric lock 1 without the sensor 22, or even if the sensor 22 is provided, the control module 18 can also control the operation of the driving device 152 without relying on the sensing result of the sensor 22. In other words, regardless of whether the locking and unlocking operation is performed through the key 3 or the rotatable knob 124 of the inner lock body 12, the driving device 152 will not be further triggered to act, thus ensuring that people who lock the door through the rotatable knob 146 from the outside must enter the corresponding verification data through the input interface 20, which can prevent people inside the house from being locked out by unauthorized users, and can also reduce the triggering of the driving device 152 to achieve the effect of saving power.

Figure 14:
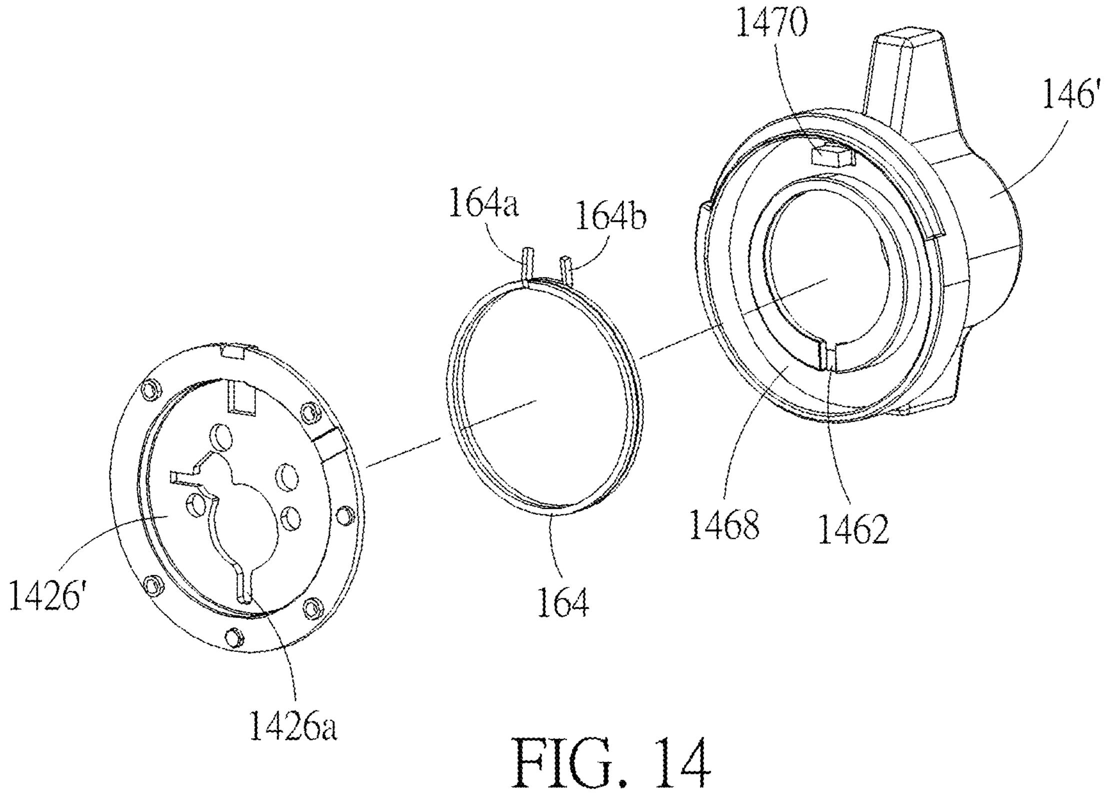
FIG. 14 is an exploded view of a reset mechanism for the rotatable knob according to an example.
Figure 15:
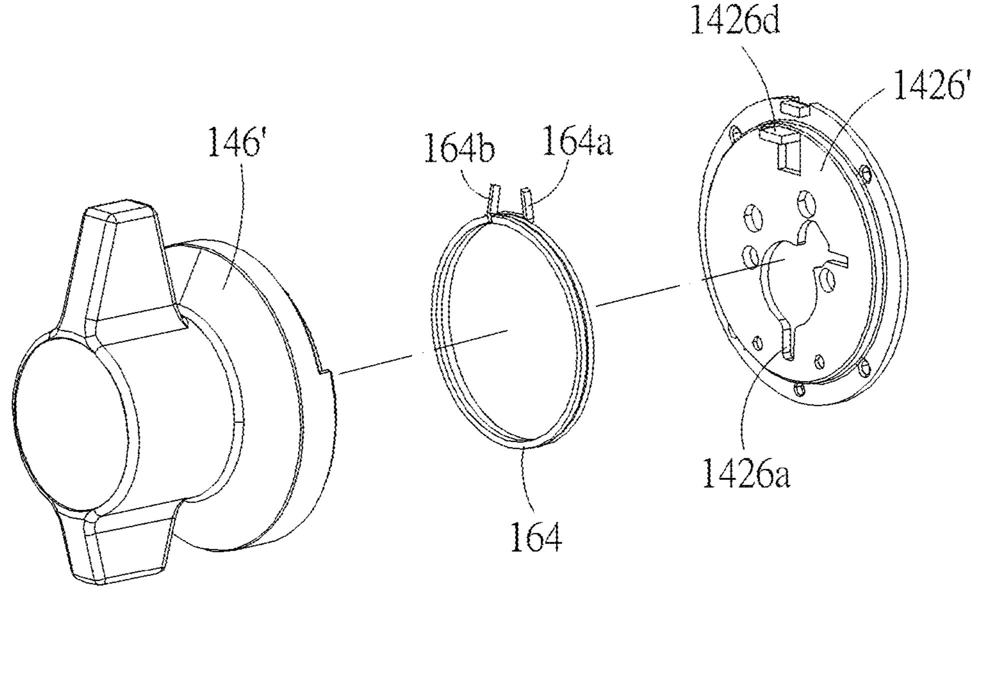
FIG. 15 is a schematic diagram of the reset mechanism in FIG. 14 in another viewpoint.

In addition, the above embodiment uses the first spring 156 and the second spring 158 as the resetting mechanism for the rotatable knob 146 relative to the fixing plate 1426, but in practice it is not limited thereto. Please refer to FIG. 14 and FIG. 15, which are exploded views of a reset mechanism according to an example in different viewpoints. This reset mechanism is also set on the rotatable knob 146' and the fixing plate 1426', and a single torsion spring 164 is provided between them. The structures of the rotatable knob 146' and the fixing plate 1426' are similar to those of the rotatable knob 146 and the fixing plate 1426 in the previous embodiment; therefore, in principle, the rotatable knob 146' and the fixing plate 1426' still use the reference symbols of the rotatable knob 146 and the fixing plate 1426. For other descriptions of the rotatable knob 146' and the fixing plate 1426', please refer directly to the relevant descriptions of the rotatable knob 146 and the fixing plate 1426, which will not be repeated in addition. In this example, the rotatable knob 146' has a circular recess 1468 and a first spring limitation block 1470 located in the circular recess 1468. The fixing plate 1426' has a second spring limitation block 1426*d*. The torsion spring 164 has two end portions 164*a* and 164*b*. The torsion spring 164 and the second spring limitation block 1426*d* are accommodated in the circular recess 1468, and the first spring limitation block 1470 and the second spring limitation block 1426*d* are located between and the two end portions 164*a* and 164*b* of the torsion spring 164.

Figure 16:
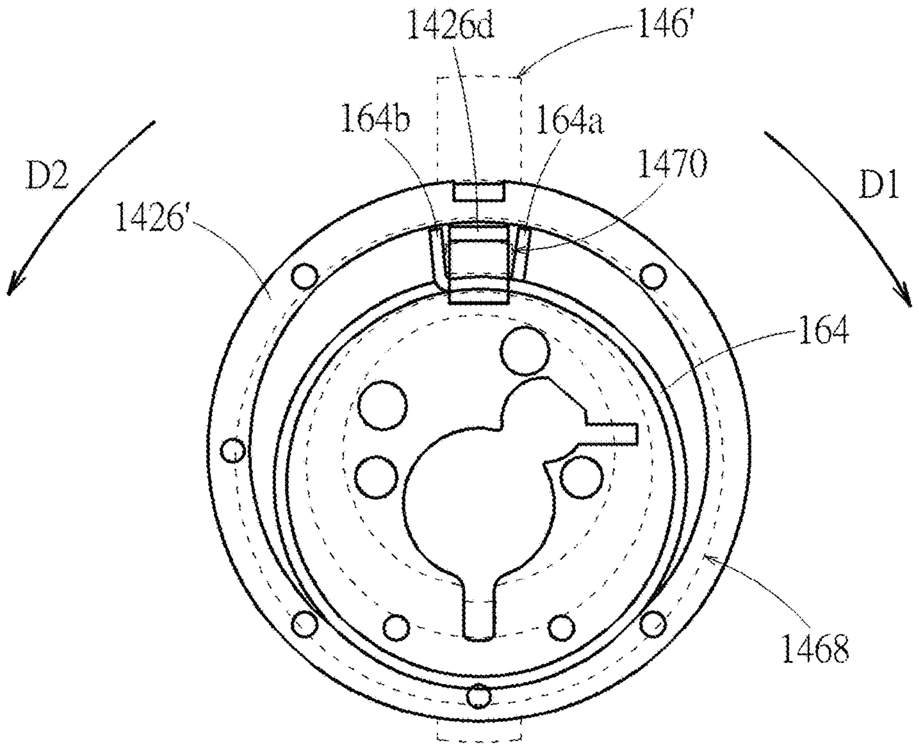
FIG. 16 is a front view of a torsion spring and a fixing plate in FIG. 14.
Figure 17:
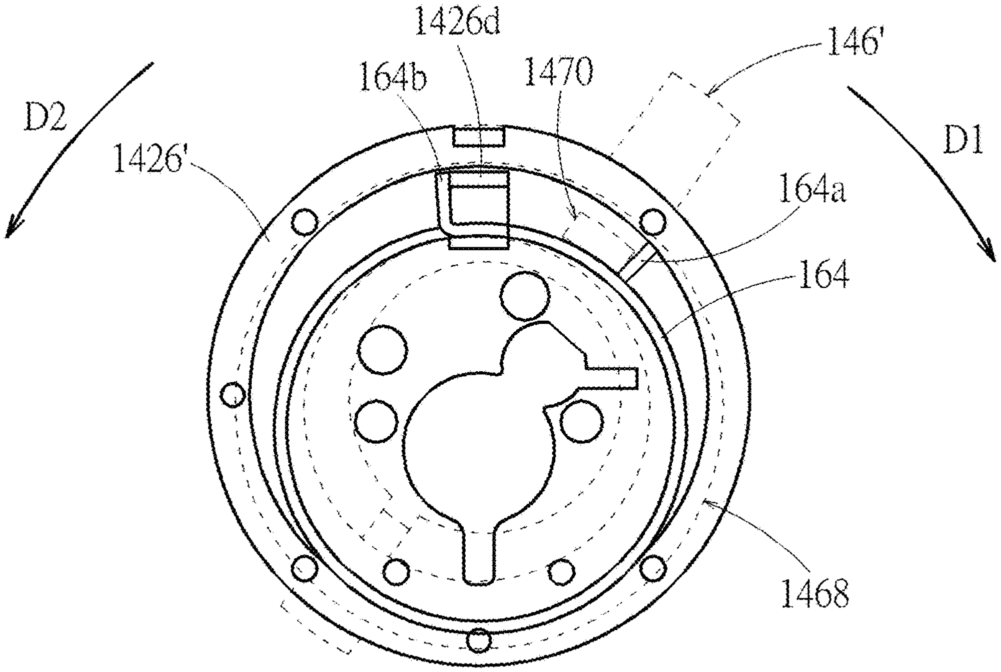
FIG. 17 is a schematic diagram of the torsion spring in FIG. 16 after it has been twisted.

Please also refer to FIG. 16 and FIG. 17, which are front views of the torsion spring 164 and the fixing plate 1426'. The viewpoint thereof is the same as FIG. 10. Therein, part of the outline of the rotatable knob 146' is shown in dashed lines in the figure. When the rotatable knob 146' is not rotated yet (as shown by FIG. 16), the first spring limitation block 1470 and the second spring limitation block 1426*d* are aligned. When the rotatable knob 146' is rotated (e.g., clockwise), the first spring limitation block 1470 is rotated to push the end portion 164*a* of the torsion spring 164, while the end portion 164*b* of the torsion spring 164 is restrained by the second spring limitation block 1426*d* so that its position remains essentially unchanged, causing the torsion spring 164 to be twisted to produce torsion, as shown by FIG. 17. If the external force for rotating the rotatable knob 146' disappears at this time, the rotatable knob 146' will rotate counterclockwise back to its original position under the resilient effect of the torsion spring 164 (as shown by FIG. 16). Similarly, when the rotatable knob 146' is rotated counterclockwise, the first spring limitation block 1470 is rotated to push the end portion 164*b* of the torsion spring 164, while the end portion 164*a* of the torsion spring 164 is restrained by the second spring limitation block 1426*d* so that its position remains essentially unchanged, causing the torsion spring 164 to be twisted to produce torsion (its schematic diagram is roughly opposite to that of FIG. 17, and thus will not be shown in actual drawing). Besides, if the external force disappears, the rotatable knob 146' will rotate clockwise back to its original position under the resilient effect of the torsion spring 164 (as shown by FIG. 16). Compared with coil springs (such as the first spring 156 and the second spring 158 mentioned above), the torsion spring 164 can provide greater elasticity and the positioning function after reset is more stable. In practice, the rotatable knob 146', the fixing plate 1426', and the torsion spring 164 can be used in the outer lock body 14 instead of the rotatable knob 146, the fixing plate 1426, the first spring 156, and the second spring 158. Besides, in this example, the torsion spring 164 is a helical torsion spring), but in practice it is not limited thereto. For example, the torsion spring 164 can instead be realized by a spiral torsion spring, of which one end is connected to the fixing plate 1426' and the other end is connected to the rotatable knob 146' and moves together with the rotatable knob 146'.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clutch mechanism, used in an electric lock, the electric lock having a lock cylinder operable with a key, the lock cylinder having a latch drive lever that extends along an axis and is rotatable about the axis, the clutch mechanism comprising:

a fixed base, the fixed base being fixedly connected to the lock cylinder;

a rotatable knob, the rotatable knob being rotatably disposed on the fixed base, the rotatable knob having a first engagement portion;

a clutch part, the clutch part being disposed movably along the axis and rotatably about the axis on the fixed base, the clutch part having a driving hole, a second engagement portion, and a first cam surface, the latch drive lever passing through the driving hole, the driving hole having a first pushing portion and a second pushing portion, the clutch part rotating the latch drive lever in a first rotation direction through the first pushing portion, the clutch part rotating the latch drive lever in a second rotation direction through the second pushing portion, the first rotation direction being opposite to the second rotation direction, the first pushing portion and the second pushing portion not abutting against the latch drive lever at the same time;

a linkage part, the linkage part being disposed rotatably about the axis on the fixed base, the linkage part having a second cam surface, the linkage part being adjacent to the clutch part along the axis, the first cam surface and the second cam surface abutting against each other;

a spring, the spring pushing the clutch part to keep the first cam surface to against the second cam surface; and a driving device, the driving device being coupled to the linkage part, the driving device driving the linkage part to rotate about the axis;

wherein the driving device drives the linkage part to rotate to make the first cam surface and the second cam surface to slide relative to each other, so that the clutch part moves along the axis to make the second engagement portion to be engaged with or disengaged from the first engagement portion.

2. The clutch mechanism according to claim 1, wherein the fixed base has a third engagement portion, and the driving device drives the linkage part to rotate to make the first cam surface and the second cam surface to slide relative to each other, so that the clutch part moves along the axis to make the second engagement portion to be disengaged from the first engagement portion and engaged with the third engagement portion, or to make the second engagement portion to be disengaged from the third engagement portion and engaged with the first engagement portion.

3. The clutch mechanism according to claim 1, further comprising a first spring and a second spring, wherein the fixed base has a spring limitation portion, the rotatable knob has an arc-shaped recess, the arc-shaped recess extends the axis, the spring limitation portion, the first spring, and the second spring are accommodated in the arc-shaped recess, the first spring is compressedly disposed between the spring limitation portion and a first end of the arc-shaped recesses, and the second spring is compressedly disposed between the spring limitation portion and a second end of the arc-shaped recesses.

4. The clutch mechanism according to claim 1, further comprising a torsion spring, wherein the rotatable knob has a circular recess and a first spring limitation block in the circular recess, the fixed base has a second spring limitation block, the torsion spring and the second spring limitation block are accommodated in the circular recess, and the first spring limitation block and the second spring limitation block are located between two end portions of the torsion spring.

5. The clutch mechanism according to claim 1, further comprising a positioning bead and a second spring, wherein the fixed base has a positioning hole, the rotatable knob has an accommodating hole, the accommodating hole has an opening and a closed end, the positioning bead is movably disposed in the accommodating hole, the second spring is compressedly disposed in the accommodating hole and between the positioning bead and the closed end, and the second spring pushes the positioning bead to move outward to snap into the positioning hole.

6. The clutch mechanism according to claim 1, wherein the linkage part has external teeth, the driving device has a motor and a pinion, the pinion is fixed on an output shaft of the motor, the pinion meshes with the external teeth.

7. The clutch mechanism according to claim 1, wherein the driving hole comprises two sector-shaped portions, and the two sector-shaped portions are symmetrical relative to the axis.

8. The clutch mechanism according to claim 1, wherein the driving hole allows the latch drive lever to rotate freely about the axis between a locked state and an unlocked state.

9. The clutch mechanism according to claim 1, further comprising a control module and a sensor, wherein the control module is electrically connected to the driving device and the sensor, the sensor is disposed to sense the latch drive lever, and the control module controls operation of the driving device based on a sensing result of the sensor.

10. The clutch mechanism according to claim 9, wherein when the control module senses through the sensor that the latch drive lever is in an unlocked state, the control module controls the driving device to drive the linkage part to rotate to make the first cam surface and the second cam surface to slide relative to each other, so that the clutch part move along the axis to make the second engagement portion to be engaged with the first engagement portion.

11. An electric lock, comprising:

a lock cylinder, the lock cylinder being operable with a key, the lock cylinder having a latch drive lever, the latch drive lever extending along an axis and being rotatable about the axis; and a clutch mechanism, the clutch mechanism comprising:

a fixed base, the fixed base being fixedly connected to the lock cylinder;

a rotatable knob, the rotatable knob being rotatably disposed on the fixed base, the rotatable knob having a first engagement portion;

a clutch part, the clutch part being disposed movably along the axis and rotatably about the axis on the fixed base, the clutch part having a driving hole, a second engagement portion, and a first cam surface, the latch drive lever passing through the driving hole, the driving hole having a first pushing portion and a second pushing portion, the clutch part rotating the latch drive lever in a first rotation direction through the first pushing portion, the clutch part rotating the latch drive lever in a second rotation direction through the second pushing portion, the first rotation direction being opposite to the second rotation direction, the first pushing portion and the second pushing portion not abutting against the latch drive lever at the same time;

a linkage part, the linkage part being disposed rotatably about the axis on the fixed base, the linkage part having a second cam surface, the linkage part being adjacent to the clutch part along the axis, the first cam surface and the second cam surface abutting against each other;

a spring, the spring pushing the clutch part to keep the first cam surface to against the second cam surface; and a driving device, the driving device being coupled to the linkage part, the driving device driving the linkage part to rotate about the axis;

wherein the driving device drives the linkage part to rotate to make the first cam surface and the second cam surface to slide relative to each other, so that the clutch part moves along the axis to make the second engagement portion to be engaged with or disengaged from the first engagement portion.

12. The electric lock according to claim 11, wherein the fixed base has a third engagement portion, and the driving device drives the linkage part to rotate to make the first cam surface and the second cam surface to slide relative to each other, so that the clutch part moves along the axis to make the second engagement portion to be disengaged from the first engagement portion and engaged with the third engagement portion, or to make the second engagement portion to be disengaged from the third engagement portion and engaged with the first engagement portion.

13. The electric lock according to claim 11, wherein the clutch mechanism comprises a torsion spring, the rotatable knob has a circular recess and a first spring limitation block in the circular recess, the fixed base has a second spring limitation block, the torsion spring and the second spring limitation block are accommodated in the circular recess, and the first spring limitation block and the second spring limitation block are located between two end portions of the torsion spring.

14. The electric lock according to claim 11, further comprising a positioning bead and a second spring, wherein the fixed base has a positioning hole, the rotatable knob has an accommodating hole, the accommodating hole has an opening and a closed end, the positioning bead is movably disposed in the accommodating hole, the second spring is compressedly disposed in the accommodating hole and between the positioning bead and the closed end, and the second spring pushes the positioning bead to move outward to snap into the positioning hole.

15. The electric lock according to claim 11, wherein the driving hole comprises two sector-shaped portions, and the two sector-shaped portions are symmetrical relative to the axis.

16. The electric lock according to claim 11, wherein the driving hole allows the latch drive lever to rotate freely about the axis between a locked state and an unlocked state.

17. The electric lock according to claim 11, wherein the clutch mechanism comprises a control module and a sensor, the control module is electrically connected to the driving device and the sensor, the sensor is disposed to sense the latch drive lever, and the control module controls operation of the driving device based on a sensing result of the sensor.

* * * * *